United States Patent [19]

Niederman

[11] Patent Number: 5,529,339
[45] Date of Patent: Jun. 25, 1996

[54] AIR BAG FOLD AND METHOD

[75] Inventor: Robert R. Niederman, Dayton, Ohio

[73] Assignee: General Motors Corporation, Detroit, Mich.

[21] Appl. No.: 407,308

[22] Filed: Mar. 20, 1995

[51] Int. Cl.⁶ .................................................. B60R 21/22
[52] U.S. Cl. ........................... 280/743.1; 280/731
[58] Field of Search .......................... 280/728.1, 743.1, 280/731, 732

[56] References Cited

U.S. PATENT DOCUMENTS

| | | | |
|---|---|---|---|
| 3,736,004 | 5/1973 | Haruna | 280/733 |
| 4,004,828 | 1/1977 | Sogabe et al. | 280/743.1 |
| 4,235,453 | 11/1980 | Lawson et al. | 280/743.1 |
| 5,022,675 | 6/1991 | Zelanak, Jr. et al. | 280/743.1 |
| 5,140,799 | 8/1992 | Satoh | 53/429 |
| 5,162,035 | 11/1992 | Baker | 493/405 |
| 5,178,407 | 1/1993 | Kelley | 280/728.1 |
| 5,275,435 | 1/1994 | Fischer | 280/743.1 |
| 5,277,230 | 1/1994 | Sollars, Jr. | 139/289 |
| 5,290,061 | 3/1994 | Bollaert | 280/743.1 |
| 5,348,341 | 9/1994 | Webber | 280/728.1 |
| 5,445,414 | 8/1995 | Pittman et al. | 280/743.1 |

FOREIGN PATENT DOCUMENTS

3-243444A 10/1991 Japan .

*Primary Examiner*—Kenneth R. Rice
*Attorney, Agent, or Firm*—Kathryn A. Marra; Charles E. Leahy

[57] ABSTRACT

A supplemental restraint system including an air bag for use in a vehicle to restrain an occupant during a sudden deceleration or collision. The air bag is folded in a hexagon configuration and mounted on a generally circular base unit such that the shape of the air bag, as folded, generally complements the shape of the base unit, thereby facilitating reducing unused space.

17 Claims, 7 Drawing Sheets

AIR BAG FOLD AND METHOD

BACKGROUND OF THE INVENTION

1. Field of the Invention

The present invention relates generally to vehicle supplemental inflatable restraint systems and, more particularly, to an air bag having an improved fold configuration.

2. Description of the Prior Art

Driver side or passenger side supplemental inflatable restraint ("SIR") systems are employed in vehicles to augment protection traditionally afforded vehicle occupants through the use of seat belts. SIR systems typically include an air bag stored in a housing module within the interior of the vehicle in close proximity to either a driver or one or more passengers. SIR systems are designed to actuate upon sudden deceleration, such as in a collision, so as to rapidly deploy an air bag to restrain the movement of the driver or passengers as the collision proceeds to prevent injury to the driver or passengers. During deployment, gas is emitted rapidly from an inflator into the air bag to expand it to a fully inflated state.

Air bags are traditionally folded in a rectangular shape. However, in an effort to minimize the space consumed by SIR systems, recent housing module designs have shifted away from using rectangular shapes. In particular, circular housing modules have become increasingly popular with SIR designers. Circular housing modules further the goal of minimizing the space consumed by SIR systems and, additionally, provide greater styling flexibility and improved aesthetics relative to the traditional rectangular housing modules.

A problem exists with the aforementioned design choices in that the traditional, rectangularly shaped SIR systems do not complement the shape defined by the circular housing modules. This results in much wasted space within the housing module. Such unused space is contrary to the desire to increase design efficiency and decrease air bag and housing module material costs in the highly competitive automotive market.

What is needed, therefore, is an air bag fold and method of folding which facilitates increasing the design efficiency of circular housing modules.

SUMMARY OF THE INVENTION

Thus, it is a primary object of this invention to provide an improved supplemental inflatable restraint system having an air bag fold configuration that facilitates increasing the design efficiency of circular housing modules.

It is a further object of the present invention to provide an improved driver side supplemental inflatable restraint system having a folded air bag that generally complements the shape of the circular housing module in which the air bag is stored to reduce the amount of unused space within the housing module.

It is a further object of the present invention to provide an improved method of folding an air bag so that the air bag, when folded, generally complements the shape of the circular housing module to increase the design efficiency of a driver side supplemental inflatable restraint system of the present invention.

In one aspect of the invention a supplemental inflatable restraint system comprises a base, an air bag mounted to the base, an inflator in fluid communication with the air bag for inflating the air bag; an air bag having a multi-sided fold configuration which generally complements the shape of the base when the air bag is installed in the base.

In another aspect of the invention an air bag folded for attachment to a mounting portion within a module assembly of a supplemental inflatable restraint system wherein the air bag is coupled to an inflator for inflating the air bag, the air bag fold comprising a stack portion, the stack portion having a width generally equal to the width of the mounting portion, the mounting portion having a generally multi-sided shape with a single axis of symmetry, the stack portion including at least two pleat folds and wherein the stack portion is folded with at least one transverse fold to provide the air bag in a shape that generally complements the shape of the mounting portion.

In a still further object of the invention a method of supplementarily restraining a vehicle occupant comprises providing a module assembly having a receiving area for receiving an air bag, the module assembly including an inflator for inflating the air bag, transversely folding the air bag such that the shape of the air bag becomes multi-sided and generally complements the shape of the receiving area, and positioning the air bag within the receiving area in operative relationship with the inflator.

These and other objects and advantages of the invention will be apparent from the following description, the accompanying drawings, and the appended claims.

DETAILED DESCRIPTION OF THE PREFERRED EMBODIMENT

The supplemental inflatable restraint system of the present invention is particularly intended to be mounted within a vehicle steering wheel assembly for restraining a driver during sudden deceleration of the vehicle, such as during a collision.

Figure 1A:
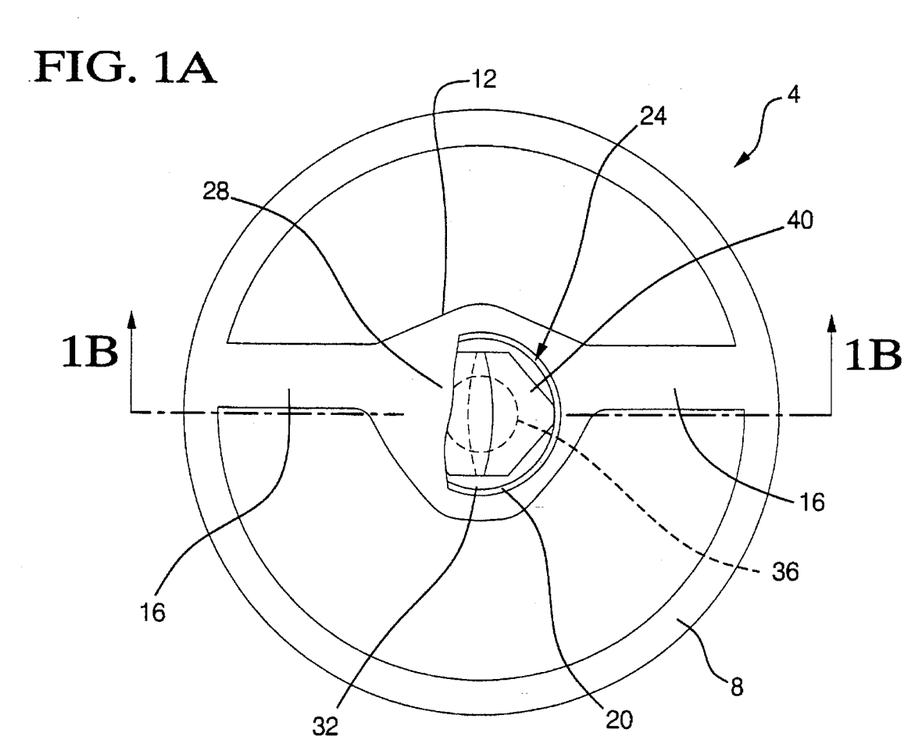
FIG. 1A is a partially cut away top plan view of a steering wheel assembly which employs a supplemental inflatable restraint system of the present invention.

Referring initially to FIG. 1A, there is shown a steering wheel assembly 4 having a rim portion 8 connected to a centrally located hub portion 12 via two connecting spokes 16. Hub portion 12 has a generally circular supplemental inflatable SIR restraint system receiving area 20 which serves as a receptacle for a supplemental inflatable restraint system (SIR system) 24. SIR system 24 includes a generally planar and circular base unit 32 having a centrally located inflator aperture 36. Thus, base unit 32 generally complements the shape of SIR receiving area 20. SIR system 24 is enclosed within SIR receiving area 20 by a cover member 28 that is contiguously formed as part of hub portion 12.

An air bag 40 is attached to base unit 32 and associated with inflator aperture 36 in a conventional manner. The exact fold configuration of air bag 40 as it resides within SIR receiving area 20 will be described later with reference to FIGS. 2–14. A generally planar inflator 44 is associated with inflator aperture 36 in a conventional manner and has generally the same circular shape as inflator aperture 36. Inflator 44 is situated adjacent base unit 32 opposite air bag 40 such that inflator 44 is in fluid communication with the interior of air bag 40 to direct an inflating fluid, such as nitrogen gas, into air bag 40 to thereby inflate air bag 40.

Figure 1B:
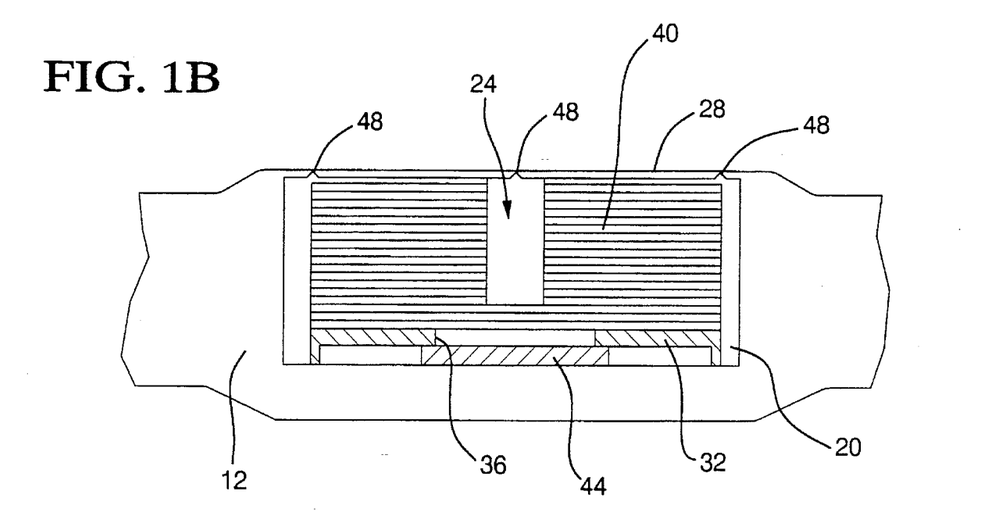
FIG. 1B is an enlarged cross-sectional view taken along line 1B—1B in FIG. 1A after a folded air bag has been mounted to the steering wheel assembly.

Referring to FIG. 1B, deployment seams 48 may be formed on the underside of cover member 28 to provide areas of weakness that will yield to open cover member 28 when inflator 44 is activated. As such, air bag 40 will penetrate through cover member 28 during deployment to inflate and absorb the force exerted by a forward traveling vehicle occupant.

As shown in FIG. 1A, air bag 40, when folded in accordance with the present invention, generally complements the circular shape of SIR receiving area 20. Folding air bag 40 as such facilitates utilizing the space within SIR receiving area 20.

Figure 2A:
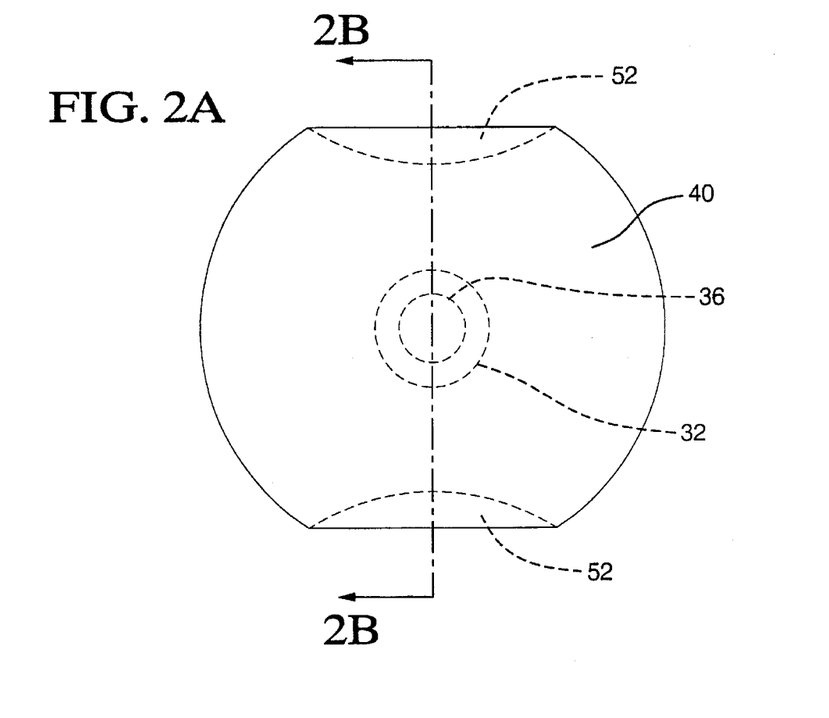
FIG. 2A is a top plan view of the first step in folding the air bag in accordance with the present invention, wherein a pair of first pleat folds extend inwardly from opposite lateral edges of the air bag and downwardly from the top surface of the air bag.
Figure 2B:
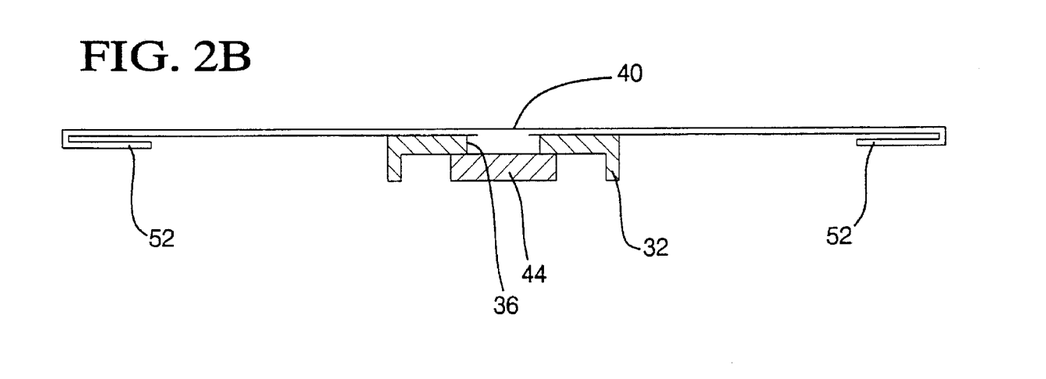
FIG. 2B is an expanded cross-sectional view taken along line 2B—2B in FIG. 2A.

As shown in FIGS. 2A and 2B, a first folding step is illustrated. A pair of first pleat folds 52 are folded under air bag 40 from opposing lateral edges thereof toward base unit 32, which bisects the opposing lateral edges of first pleat folds 52. Folded as such, each lateral edge of first pleat fold 52 is parallel to the opposing lateral edge. Each first pleat fold 52, and the subsequent pleat folds of the present invention hereafter disclosed with reference to FIGS. 3A–5B, have a width of approximately one-twelfth the diameter of air bag 40. In the embodiment being described, the width of each first pleat fold is approximately 2 inches.

Figure 3A:
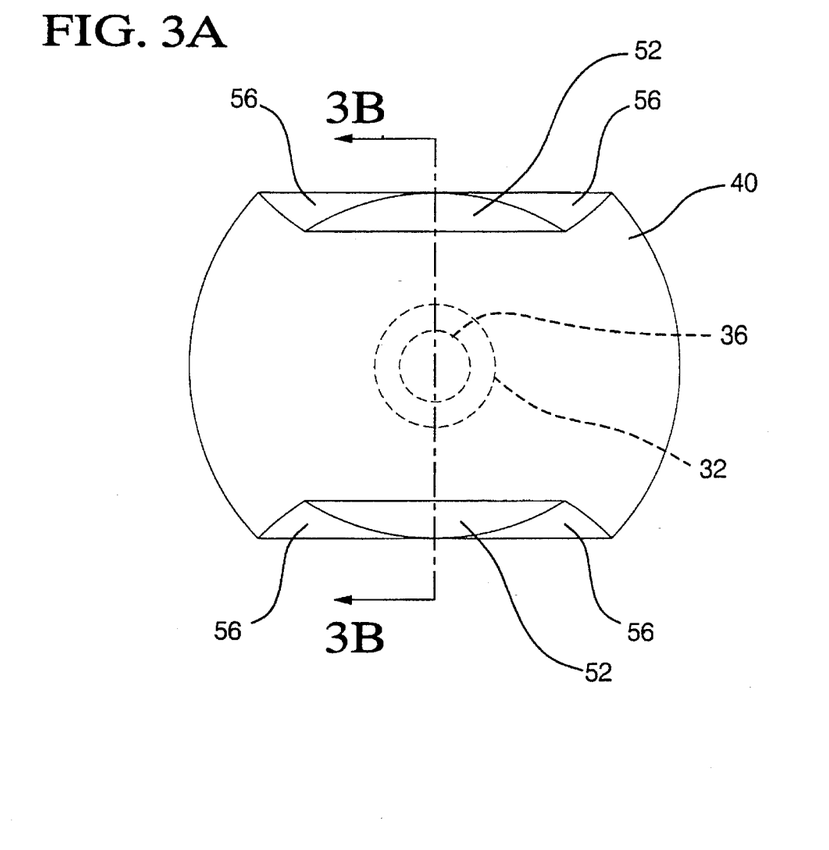
FIG. 3A is a top plan view of the second step in folding the air bag in accordance with the present invention, wherein the air bag is folded to have a pair of second pleat folds extending inwardly from opposite lateral edges of the air bag and upwardly from the bottom surface of the air bag.
Figure 3B:
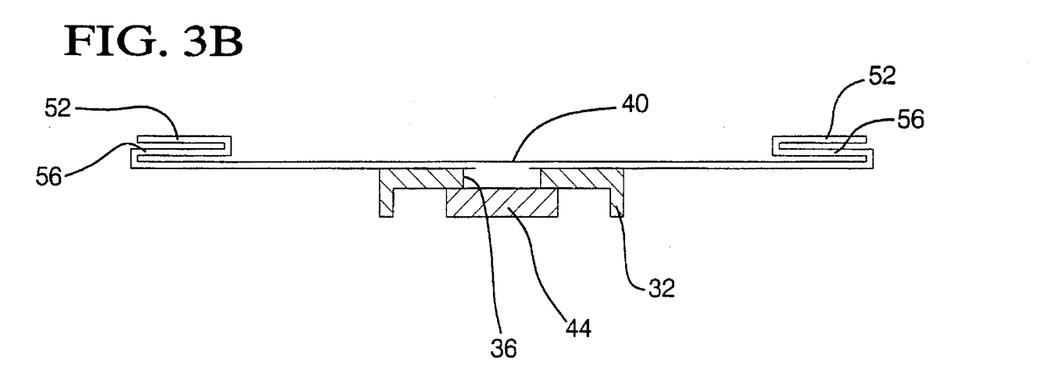
FIG. 3B is an expanded cross-sectional view taken along line 3B—3B in FIG. 3A.

Referring now to FIGS. 3A and 3B, shown is the second step in folding air bag 40 in accordance with the present invention. A pair of second pleat folds 56 are formed by folding the parallel lateral edges of first pleat folds 52 upward from the underside of air bag 40 and inward toward base unit 32. As shown in FIG. 3B, second pleat folds 56 have approximately the same width as first pleat folds 52. Second pleat folds 56, however, are folded in the opposite direction as were first pleat folds 56 relative to the surface of air bag 40.

Figure 4A:
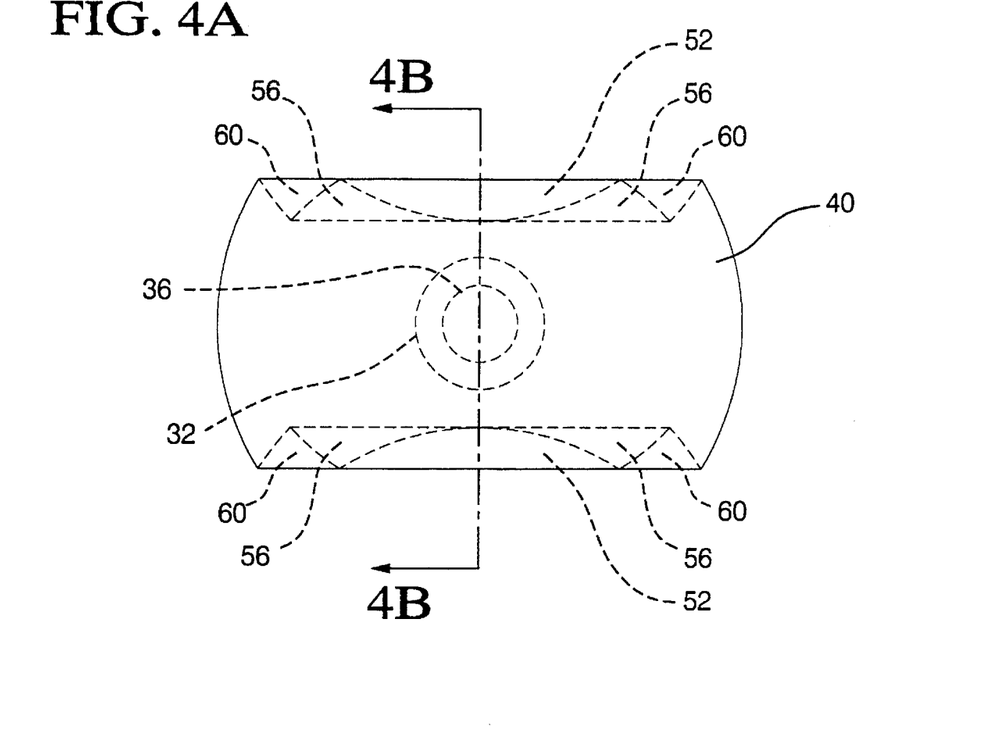
FIG. 4A is a top plan view of the third step in folding the air bag in accordance with the present invention, wherein the air bag has a pair of third pleat folds extending inwardly from opposite lateral edges of the air bag and downwardly from the top surface of the air bag.
Figure 4B:
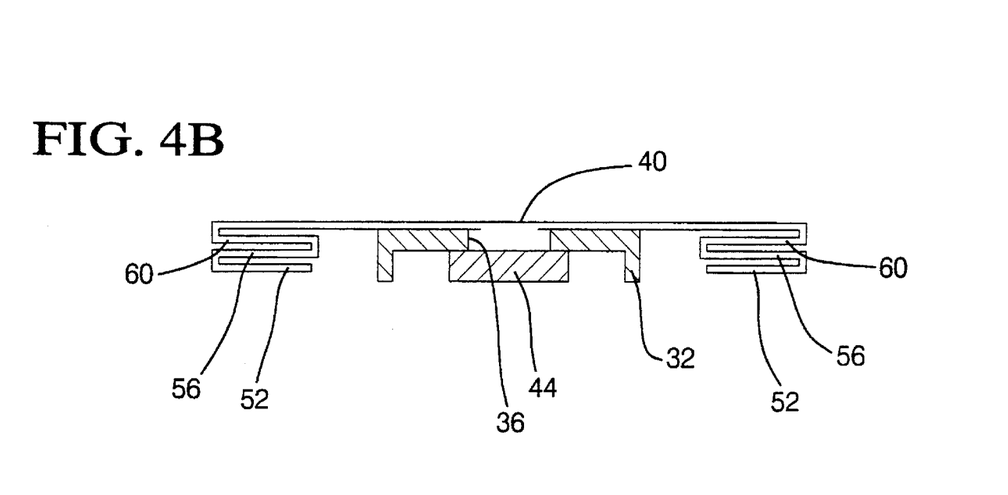
FIG. 4B is an expanded cross-sectional view taken along line 4B—4B in FIG. 4A.

Referring now to FIGS. 4A and 4B, shown is the third step in folding air bag 40 in accordance with the present invention. A pair of third pleat folds 60 are formed by folding the lateral edge of each second pleat fold 56 downward from the surface of air bag 40 and inward toward base unit 32. As such, third pleat folds 60 are folded under air bag 40, in the same direction that first pleat folds 52 were folded in relation to the surface of air bag 40. The width of third pleat folds 60 is approximately 2 inches, or generally the same width as the stacked combination of first and second pleat folds 52, 56.

Figure 5A:
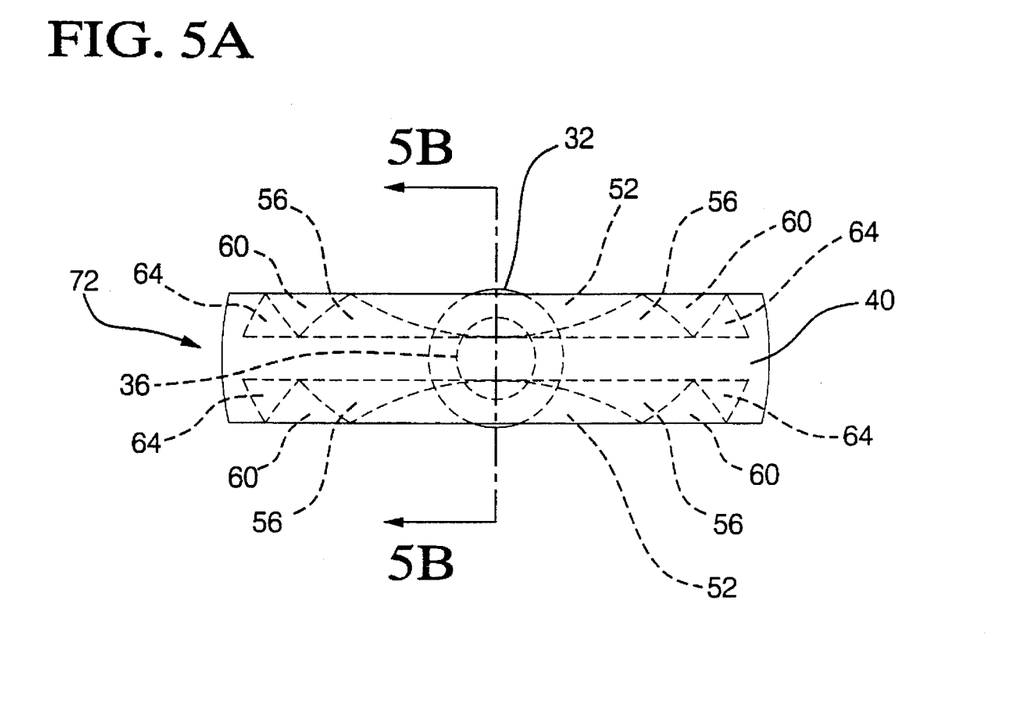
FIG. 5A is a top plan view of the fourth step in folding the air bag in accordance with the present invention, wherein the air bag has a pair of fourth and fifth pleat folds extending inwardly from opposite lateral edges of the air bag to envelop the first, second and third pleat folds therebetween.
Figure 5B:
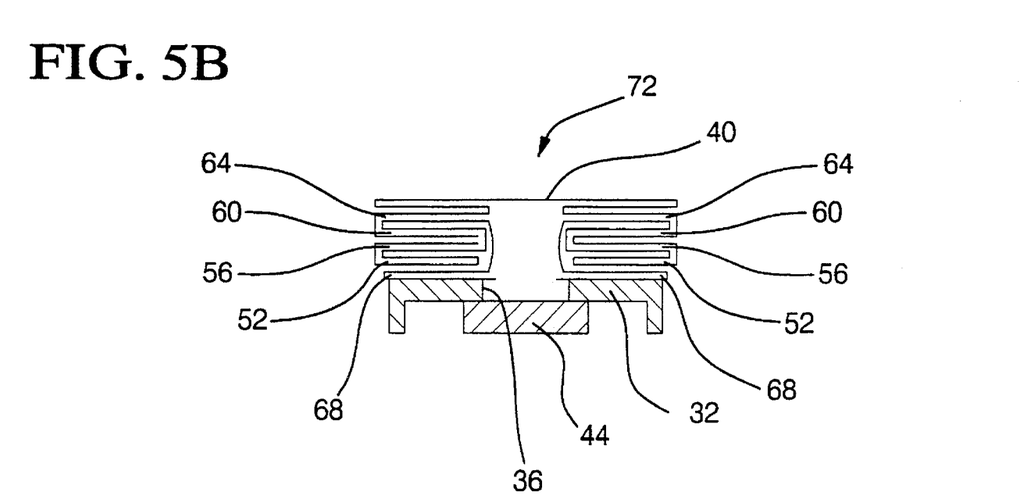
FIG. 5B is a cross-sectional view taken along line 5B—5B in FIG. 5A.

Referring now to FIGS. 5A and 5B, a fourth step in folding air bag 40 in accordance with the present invention. The stacked combination of first, second and third pleat folds 52, 56, 60 is drawn laterally inward toward inflator aperture 36 such that a pair of fourth pleat folds 64 and a pair of fifth pleat folds 68 are formed above and below the aforementioned stacked combination, respectively.

As shown in FIG. 5B, fourth and fifth pleat folds 64, 68 have generally the same width as the stacked combination of first, second and third pleat folds 52, 56, 60. The stacked combination of first, second, third, fourth and fifth pleat folds 52, 56, 60, 64, 68, heretofore referred to as pleat stack 72, has a combined width generally equal to the diameter of circular base unit 32. As such, fifth pleat folds 68 cannot be seen in FIG. 5A. While FIG. 5B illustrates pleat stack 72 in a relatively expanded form for clarity, it should be noted that the stacked combination of pleat folds which comprise pleat stack 72 reside in close vertical proximity to one another. In the present embodiment, pleat stack 72 is approximately 0.5 inches in height.

A fold progression of pleat stack 72 in accordance with the present invention is illustrated in FIGS. 6–14. For simplicity, base unit 32 and inflator 44 are not shown in FIGS. 6–14, so as to focus wholly on the fold progression of pleat stack 72. Also in the interest of clarity, pleat stack 72 is shown in FIGS. 6–14 without setting out the detailed stack combination of first, second, third, fourth and fifth, and sixth pleat folds 52, 56, 60, 64, 68 as illustrated in FIGS. 5A and 5B.

Figure 6:
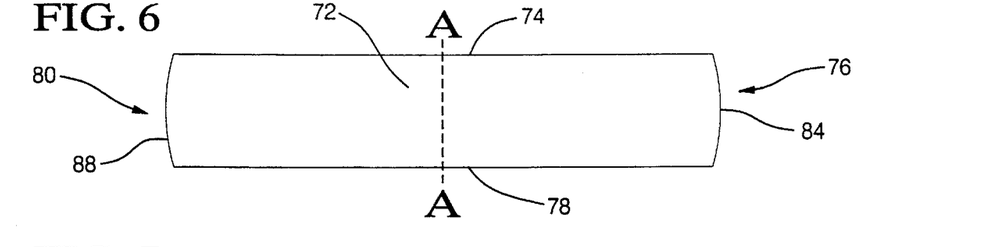
FIGS. 6–14 illustrate the hexagonal fold progression of an air bag in accordance with the present invention which provides the air bag in a shape that generally complements the shape of a circular housing module.
Figure 13:
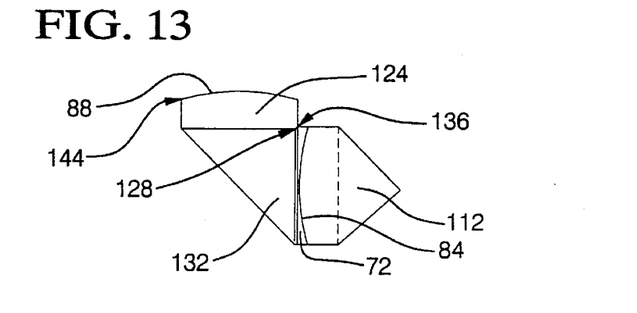
Figure 14:
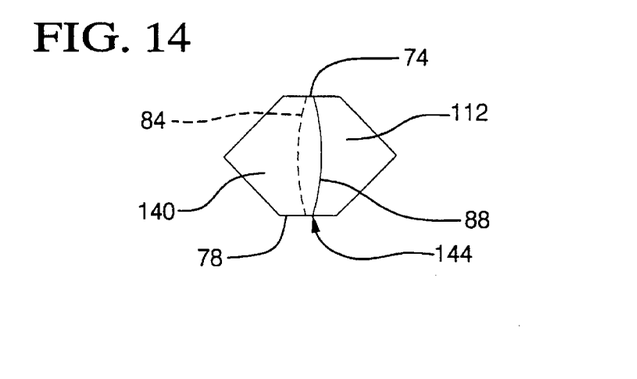

FIG. 6 illustrates a top plan view of pleat stack 72. Line A—A bisects pleat stack 72 to define a first pleat stack arm 76 and a second pleat stack arm 80. Line A—A represents the approximate center of circular base unit 32 (not shown). Pleat stack 72 is bounded by a first end portion 84 and a second end portion 88, both of which have an arcuate peripheral profile, as well as a first and a second lateral edge 74, 78. First and second pleat stack arms 76, 80 are folded in accordance with FIGS. 7–14 to end in a generally hexagonal shape, as depicted in FIG. 14. As is shown in FIGS. 7–14, first and second pleat stack arms 76, 80 are folded outwardly from the center of base unit 32 (not shown) toward first end portion 84 and second end portion 88, respectively.

Figure 7:
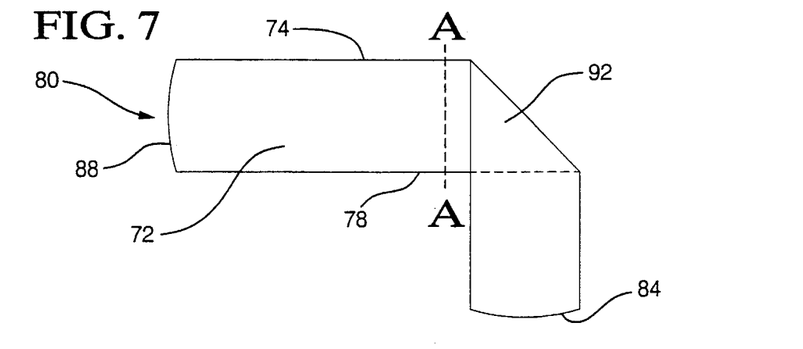

Referring to FIG. 7, a fifth folding step in accordance with the present invention is shown. First pleat stack arm 76 is folded perpendicularly toward second lateral edge 78 of pleat stack 72 to provide a first transverse fold 92. First transverse fold 92 lies directly superior to pleat stack 72 with the medial edge of first transverse fold 92 positioned parallel to, and laterally away from line A—A. In the embodiment shown, the distance between the medial edge of first transverse fold 92 and line A—A, depicting the center of base unit 32, is approximately 1.5 inches.

Figure 8:
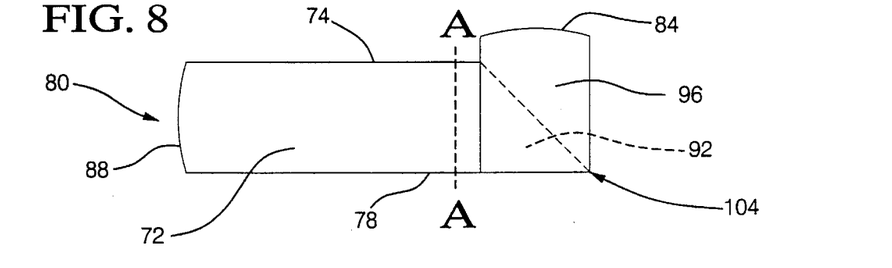

As shown in FIG. 8, the sixth folding step is shown in accordance with the present invention. First transverse fold 92 is folded 180 degrees back onto itself to provide a second transverse fold 96. Second transverse fold 96 is parallel to, and directly superior to, first transverse fold 92. In the embodiment shown, first end portion 84 of first pleat stack arm 76 extends perpendicularly past first lateral edge 74 of pleat stack 72 by approximately 1.5 inches. A first lateral corner 104 is defined as the most lateral corner of second transverse fold 96 at the point where first and second transverse folds 92, 96 meet.

During a seventh folding step (FIG. 9), a third transverse fold 100 is formed by folding first lateral corner 104 approximately 180 degrees onto second transverse fold 96 and toward a first junction point 108. First junction point 108 is defined as the point at which the medial edge of second transverse fold 96 extends perpendicularly over first lateral edge 74 of pleat stack 72.

Figure 9:
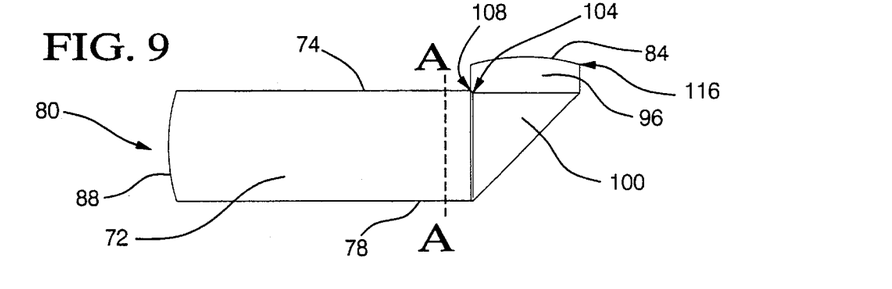
Figure 10:
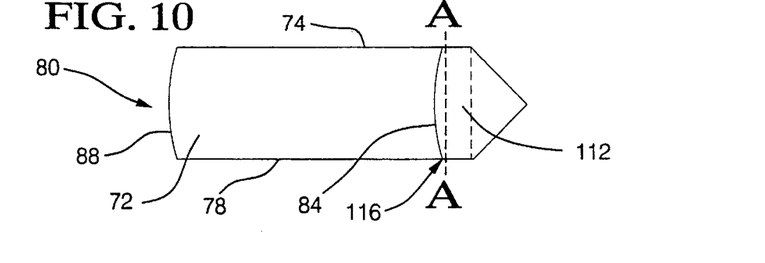

An eighth folding step (FIG. 10) illustrates the folded combination of first, second and third transverse folds 92, 96, 100 is further folded to produce a fourth transverse fold 112. Referring to FIGS. 9 and 10, fourth transverse fold 112 is formed by folding a second lateral corner 116 of second transverse fold 96 generally toward the center of base unit 32 (not shown), thereby folding third transverse fold 100 onto itself. Folded as such, first end portion 84 extends slightly past the center of base unit 32 (not shown) such that the lateral edges of second transverse fold 96 are generally flush with first and second lateral edges 74, 78 of pleat stack 72. In the embodiment shown, first end portion 84 extends past the center of base unit 32 (not shown) by approximately 0.75 inches.

Figure 11:
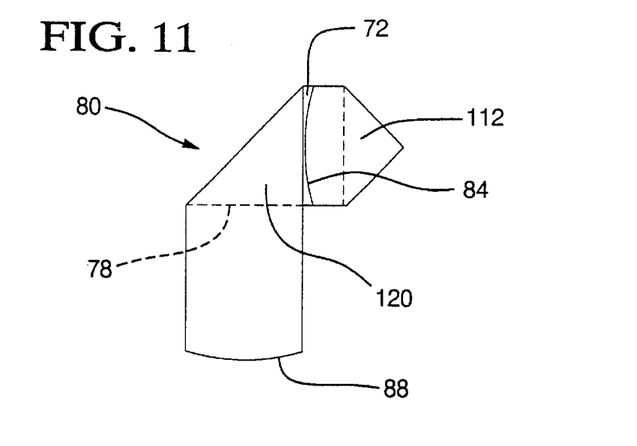

As shown in FIG. 11 a second pleat stack arm 80 is folded perpendicularly across second lateral edge 78 of pleat stack 72 to provide a fifth transverse fold 120. Fifth transverse fold 120 lies directly superior to pleat stack 72 with the medial edge of fifth transverse fold 120 generally flush with first end portion 84.

Figure 12:
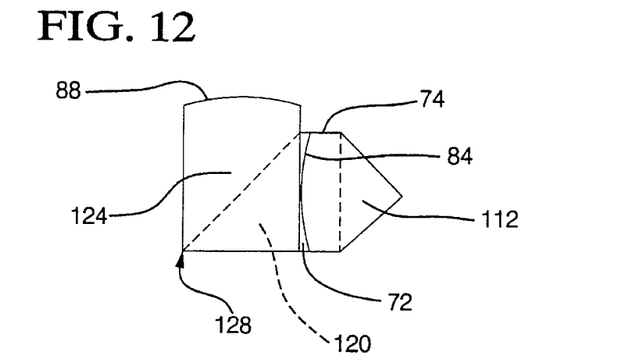

Referring now to FIG. 12, shown is the tenth folding step in accordance with the present invention. Fifth transverse fold 120 is folded 180 degrees back onto itself to provide a sixth transverse fold 124 such that sixth transverse fold 124 is parallel to, and directly superior to, fifth transverse fold 120. In the embodiment shown, second end portion 88 extends perpendicularly past first lateral edge 74 of pleat stack 72 by approximately 1.5 inches. A third lateral corner 128 is defined as the most lateral corner of sixth transverse fold 124 at the point where fifth and sixth transverse folds 120, 124 meet.

The eleventh folding step (FIG. 13) is shown in accordance with the present invention. A seventh transverse fold 132 is formed by folding third lateral corner 128 approximately 180 degrees onto sixth transverse fold 124 toward a second junction point 136. Referring to FIGS. 12 and 13, second junction point 136 is defined as the point at which the medial edge of sixth transverse fold 124 extends perpendicularly over first lateral edge 74 of pleat stack 72.

Referring now to FIG. 14, the twelfth and final folding step is shown in accordance with the present invention. The folded combination of fifth, sixth and seventh transverse folds 120, 124, 132 is further folded to produce an eighth transverse fold 140. Referring to FIGS. 13 and 14, eighth transverse fold 140 is formed by folding a fourth lateral corner 144 of sixth transverse fold 124 generally toward the center of base unit 32 (not shown), thereby folding seventh transverse fold 132 onto itself. Folded as such, second end portion 88 extends slightly past the center of base unit 32 (not shown) such that the lateral edges of eighth transverse fold 140 are generally flush with first and second lateral edges 74, 78 to produce pleat stack 72 in a generally hexagonal shape.

It should be noted that, as an alternative, the fold progression as described with reference to FIGS. 6–14 can be reversed to produce the same final air bag fold as is illustrated in FIG. 14.

Referring to FIGS. 1 and 14, the folded combination of first, second, third, fourth, fifth, sixth, seventh and eighth transverse folds 92, 96, 100, 12, 120, 124, 132, 140 generally complements the shape of base unit 32. This is a significant and important improvement over prior art SIR systems where the air bag, as folded, typically does not complement the shape of the underlying base unit. This facilitates reducing multi-sided unused space in the SIR receiving area.

Additionally, the generally circular shape of the air bag fold of the present invention can be used in any SIR receiving area shape by using flanges to expand out the air bag sides from the generally circular configuration. Thus, the air bag fold of the present invention provides greater styling flexibility by being compact, but also due to the versatility provided by being capable of use in any shape receiving area.

In the highly competitive automotive market, efficiently utilizing the space within an SIR system may translate into substantial cost savings. Also, making more efficient use of the space within an SIR system may allow for bolstering the size of other components, such as the inflator.

Additionally, by creating a more compact air bag which better complements the shape of the base unit and SIR receiving area, the size of the SIR receiving area may be decreased. Such a decrease in size may also be advantageous in reducing costs associated with manufacturing such an SIR system. The SIR system may also be more aesthetically pleasing, with a low profile with respect to the steering wheel assembly, with such a reduction in SIR system size.

While the forms of the device herein described constitute the preferred embodiments of the invention, it is to be understood that the invention is not limited to these precise forms of the device. For example, air bag 40 could be folded or rolled to have fewer or more folds than those describe above, and the various steps may be performed in a different sequence.

Thus, changes may be made without departing from the scope of the invention which is defined in the appended claims.

What is claimed is:

1. A supplemental inflatable restraint system, comprising:

a base;

an air bag mounted to said base, said base having a generally hexagonal shape; and an inflator in fluid communication with said air bag for inflating said air bag;

said air bag having a multi-sided fold configuration which generally complements the shape of said base when said air bag is installed in said base.

2. The supplemental inflatable restraint system as set forth in claim 1 wherein said configuration comprises an air bag folded into a pleat fold stack having at least one transverse fold;

wherein said pleat fold stack is folded to provide said pleat fold stack in a shape that generally complements the shape of said base.

3. The supplemental inflatable restraint system as set forth in claim 2 wherein said pleat fold stack is folded to form a plurality of transverse folds that converge at or near an axis of symmetry of said base to provide said air bag in a shape which generally complements the shape of said base.

4. The supplemental inflatable restraint system as set forth in claim 2 wherein said pleat fold stack is divided into a first pleat stack and a second pleat stack;

said first and second pleat stacks extending away from said axis of symmetry of said base.

5. The supplemental inflatable restraint system as set forth in claim 1 wherein said multi-sided fold configuration comprises a first pleat stack and a second pleat stack;

said first and second pleat stacks extending laterally away from said base.

6. The supplemental inflatable restraint system as set forth in claim 5 wherein said first pleat stack and said second pleat stack are folded in a generally transverse fashion to provide said air bag in said multi-sided fold configuration.

7. The supplemental inflatable restraint system as set forth in claim 6 wherein said first pleat stack and said second pleat stack are transversely folded outwardly from said base to provide said air bag in a generally hexagonal shape.

8. The supplemental inflatable restraint system as set forth in claim 1 wherein said air bag is folded laterally from opposite sides of said air bag inward toward a center portion thereof to provide a pleat stack having a width generally equal to the width of said base.

9. The supplemental inflatable restraint system as set forth in claim 8 wherein said pleat stack is transversely folded onto itself to provide said air bag with a shape that generally complements the shape of said base.

10. A method of supplementarily restraining a vehicle occupant comprising the steps of:

providing a module assembly having a receiving area for receiving an air bag, said receiving area being generally hexagonal in shape, said module assembly including an inflator for inflating said air bag;

transversely folding said air bag such that the shape of said air bag becomes multi-sided and generally hexagonal in shape and generally complements the hexagonal shape of said receiving area; and positioning said air bag within said receiving area in operative relationship with said inflator.

11. The method of supplementarily restraining a vehicle occupant as in claim 10 wherein said transverse folding step further includes the step of pleating said air bag inward from opposing lateral edges to provide a pleat fold stack with a width generally equal to the width of said receiving area.

12. The method of supplementarily restraining a vehicle occupant as in claim 10 wherein the step of transversely folding said air bag further comprises the step of forming a first pleat portion and a second pleat portion, said first and said second pleat portions extending laterally away from a central portion of said module assembly.

13. The method of supplementarily restraining a vehicle occupant as in claim 10 wherein the step of transverse folding said air bag further comprises the step of folding a first pleat portion and a second pleat portion inwardly toward a central portion of said module assembly to provide said air bag in a folded condition that generally complements the shape of said receiving area of said module assembly.

14. A supplemental inflatable restraint system, comprising:

a base;

an air bag mounted to the base;

an inflator in fluid communication with the air bag for inflating the air bag; and the air bag having a multi-sided fold configuration to produce a folded pleat stack having a generally hexagonal shape.

15. The supplemental inflatable restraint system of claim 14 wherein the folded pleat stack includes first and second laterally extending pleat stack arms, each of the pleat stack arms folded onto itself to provide the folded pleat stack having a generally hexagonal shape.

16. The supplemental inflatable restraint system of claim 15 wherein the pleat stack arms each include a lateral outermost end portion and wherein the lateral outermost end portions of the pleat stack arms overlap each other when the folded pleat stack is in the generally hexagonal shape.

17. The supplemental inflatable restraint system of claim 15 wherein the pleat stack arms each include a series of generally triangular folds including a final triangular fold and a second to the final triangular fold and wherein each of the final triangular folds also triangularly folds over the second to the final triangular fold onto itself.

\* \* \* \* \*